A. L. COMSTOCK.
PROCESS AND APPARATUS FOR VULCANIZING RUBBER GOODS.
APPLICATION FILED MAY 16, 1913.
1,289,043.
Patented Dec. 24, 1918.
3 SHEETS—SHEET 3.
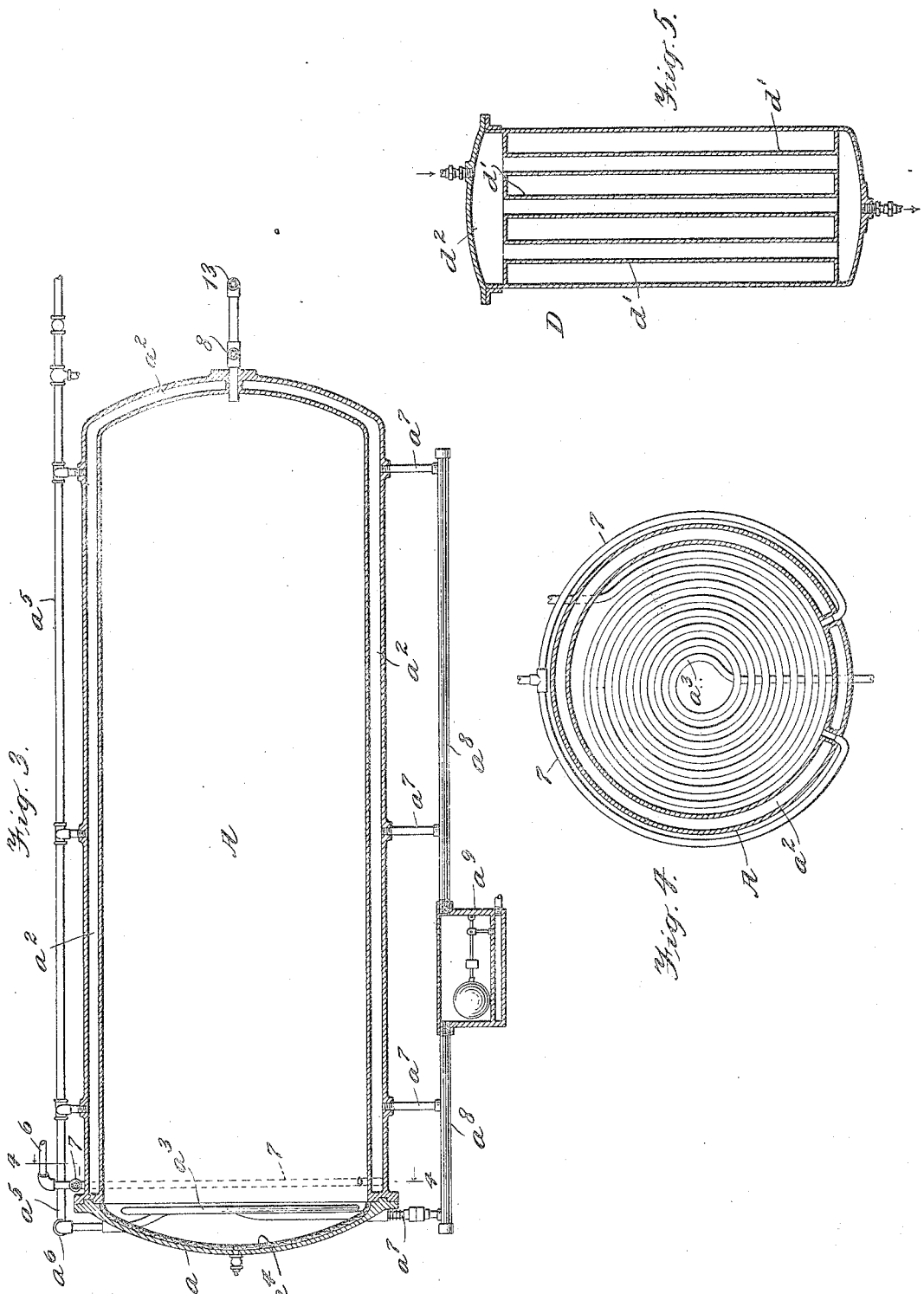

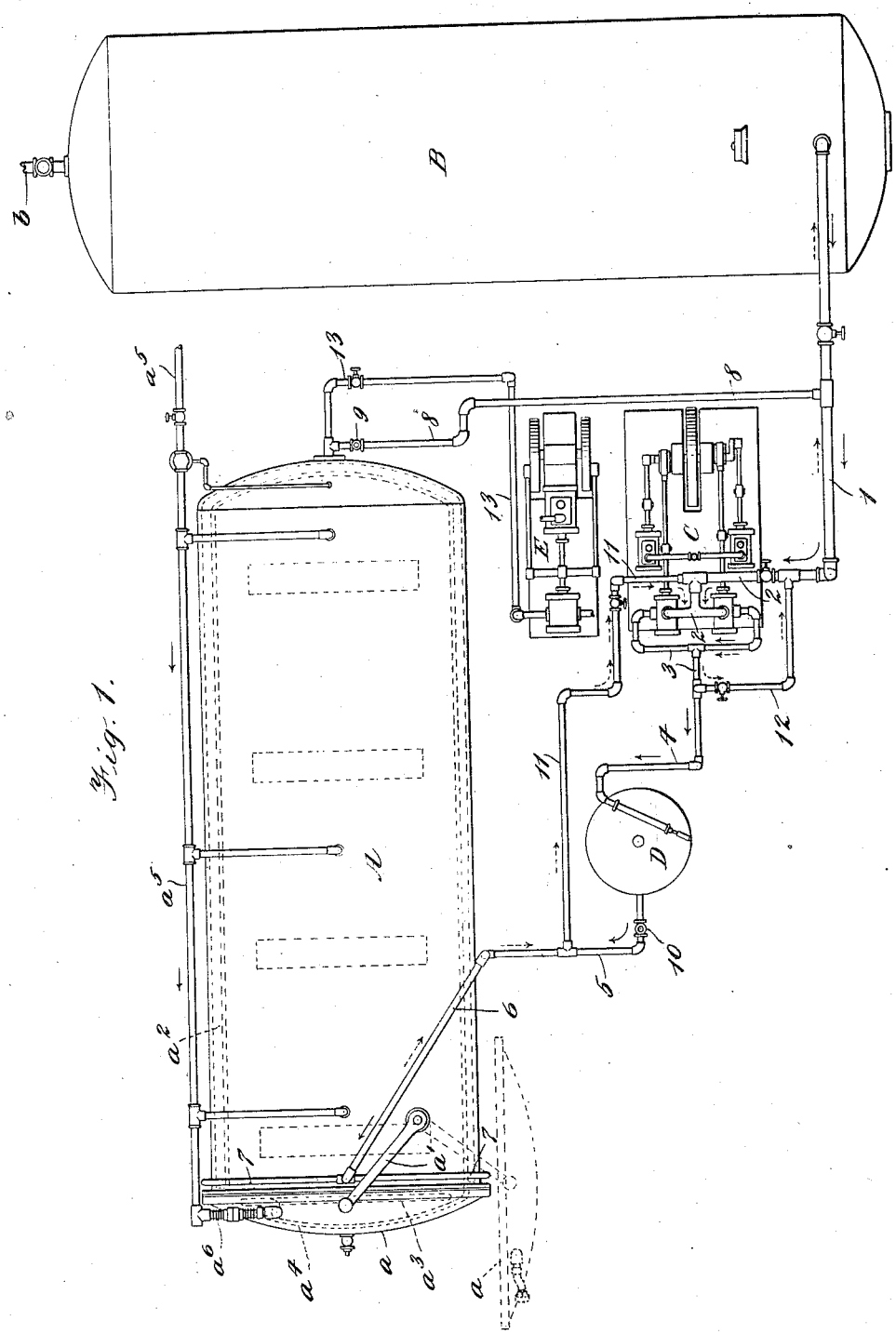

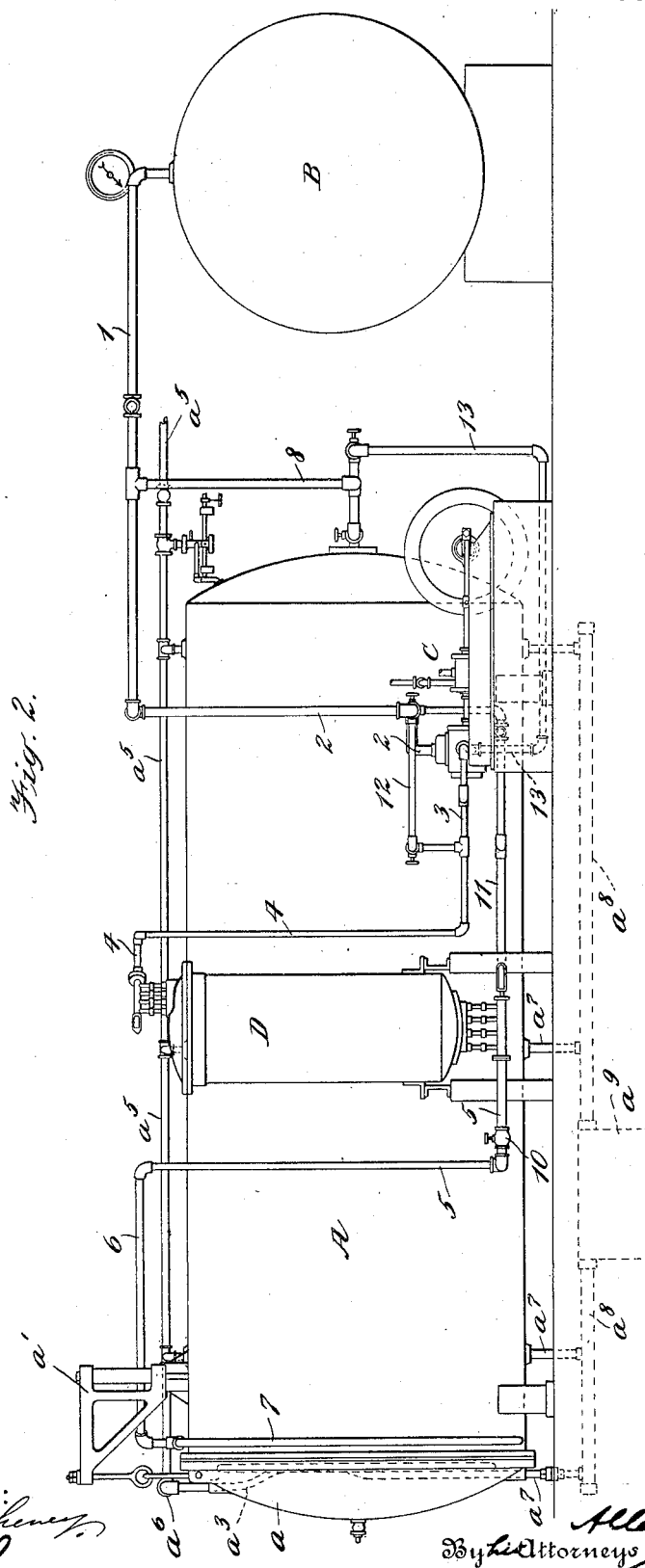

UNITED STATES PATENT OFFICE.

ALLEN L. COMSTOCK, OF BOSTON, MASSACHUSETTS, ASSIGNOR TO AMERICAN RUBBER COMPANY, A CORPORATION OF MASSACHUSETTS.

PROCESS AND APPARATUS FOR VULCANIZING RUBBER GOODS.

1,289,043.   Specification of Letters Patent.   Patented Dec. 24, 1918.

Application filed May 16, 1913. Serial No. 767,967.

*To all whom it may concern:*

Be it known that I, ALLEN L. COMSTOCK, a citizen of the United States, a resident of Boston, in the county of Suffolk and State of Massachusetts, have invented certain new and useful Improvements in Processes and Apparatus for Vulcanizing Rubber Goods, of which the following is a specification.

My invention relates to processes and apparatus for vulcanizing rubber goods. I will describe a process embodying my invention as well as an apparatus also embodying the same, to which the present process and other processes for vulcanizing may be applied.

In the practice of my process for the vulcanization of rubber goods, I create a desired vacuum within a vulcanizing oven, and after the desired vacuum is obtained, I introduce into the oven a vulcanizing medium. The vulcanizing medium which I prefer is in the form of a gas. One purpose of creating a vacuum in the vulcanizing oven, and afterward introducing the vulcanizing medium, is to insure a better distribution of the vulcanizing medium throughout the oven so that there will be more uniformity of the vulcanizing heat in all parts of the oven. In order to obtain the best results from the use of a vacuum, both as regards obtaining uniformity of heat for vulcanization and the removal of volatile substances or gases from the rubber goods to be vulcanized, I prefer to heat the vulcanizing oven before creating therein the desired vacuum. The vulcanizing medium is heated to the vulcanizing temperature either before being introduced in the vulcanizing oven or after it has been introduced in the oven or while being introduced in the oven. The vulcanizing medium also may or may not be under pressure. In practice I have successfully used carbon dioxid gas as a vulcanizing medium, though it will be understood that I do not limit myself to this gas, as other gases or inert vapors may be used. When carbon dioxid is employed the use of the vacuum has the additional function of excluding air from the system and process.

The vulcanizing oven during vulcanization may be at a temperature equal to or above, or below the vulcanization temperature of the vulcanizing medium. In practice I have found that good results are obtained when the temperature of the vulcanizing oven is above the temperature of the vulcanizing medium, thus eliminating the effect of radiation of heat from the vulcanizing medium.

One way of carrying out my process of vulcanizing rubber goods, such for example as rubber foot-wear, is to heat the vulcanizing oven, before or after the rubber goods to be vulcanized are placed within it, and the oven tightly closed by its door or cover. In practice I have found that the best results are obtained when the vulcanizing oven is uniformly heated at all points. This uniformity of heat throughout all portions of the vulcanizing oven may be secured by completely surrounding it by a steam jacket. For practical reasons, in the case of a steam jacket, that portion applied to the door or cover of the vulcanizing oven may be formed by a heating coil in the door or cover. I may, however, heat the vulcanizing oven by means of steam coils arranged within the oven through which steam is circulated in any well known way. Preferably, if this form of heating is used, there will be four coils, each coil arranged in a quadrant, and the steam circulation through each quadrant is from the topmost coil downward. The steam jacket about the oven proper and the steam coil are supplied from a source of steam which circulates in the steam jacket and coil. To prevent radiation of heat from the oven, a suitable heat insulator, such as asbestos, may be employed.

After the air is extracted by a vacuum apparatus the vulcanizing medium, such as carbon dioxid gas, is then introduced into the vulcanizing oven so as to completely fill it. Preferably, to be sure that only the vulcanizing medium is within the vulcanizing oven, and for economical reasons and the other reasons hereinbefore stated in carrying out my process, I create a desired vacuum within the vulcanizing oven by means of a vacuum pump. In practice I create a vacum of about 28 inches, but lesser vacuums may be employed.

I may state at this point that the heating of the vulcanizing oven to the desired temperature may be obtained while the vulcanizing oven is being exhausted by the vacuum pump. Also in the event that the vulcanizing medium is raised to the proper vulcanizing temperature and pressure (if the medium is to be used under pressure) within the vulcanizing oven, the vulcanizing oven may be raised to its proper temperature during the heating of the gas. It is also within my invention to have a desired temperature and pressure of the carbon dioxid gas in the storage tank. The variations of these several steps may take place according to circumstances, because in my process the principal function of the heated insulating oven is as an insulator to prevent radiation of heat from the vulcanizing medium and to hold the vulcanizing medium at the proper vulcanizing temperature.

When the vulcanizing medium is carbon dioxid gas, it is stored in a suitable storage tank under pressure, and when in use in the vulcanizing oven it attains a pressure of from 30 to 32 pounds. I have found it necessary to have a definite relation between the pressure and temperature of the gas before entering the vulcanizing oven to obtain precise conditions within the oven. The storage tank should be of such capacity as to quantity and pressure that will insure the proper volume of gas in the oven at the desired pressure and temperature. The desired pressure of the carbon dioxid gas in the vulcanizing oven may be obtained by means of a compression pump, and preferably by a duplex compression pump; that is, a compression pump which steadily and gradually increases the pressure without intermittent reduction. Thus the rubber goods are subjected to a constant gradually increasing pressure. The heating of the carbon dioxid gas may be accomplished in any desired way. One way in which this may be done is by a preheater which raises the carbon dioxid gas to the vulcanizing temperature as it enters the vulcanizing oven. The preheater may assume any desired form, but I prefer to employ a series of coils, through which the gas flows, inclosed within a casing. Steam is circulated within the casing at a pressure which will heat the carbon dioxid gas to the required vulcanizing temperature. Of course, suitable gages are provided to indicate pressures of steam wherever required, as well as the pressure of the carbon dioxid within the vulcanizing oven, and also a suitable thermometer or thermometers to indicate when the proper vulcanizing temperature of the carbon dioxid gas has been reached while in the vulcanizing oven. In order that a uniform temperature of the vulcanizing gas may be attained by the carbon dioxid gas, I prefer to circulate it through the preheater, for a period of time, and to accomplish this I employ a suitable pump, which may be the duplex compression pump, which withdraws the gas from the vulcanizing oven at one end and introduces it into the vulcanizing oven at the other end, meanwhile passing the carbon dioxid gas through the preheater. When the carbon dioxid gas has reached the vulcanizing temperature it is confined in the vulcanizing oven for the length of time required to accomplish vulcanization of the rubber goods, its temperature being maintained by the heated vulcanizing oven.

After the vulcanization of the rubber goods has been completed, the carbon dioxid gas may be returned to the storage tank for further use.

Above I have set forth at length the different steps of my process and some variations thereof within the scope of the invention, together with the purposes of the different steps and their variations. I will now state, briefly, one method of procedure employed in the vulcanization of goods commercially.

The vulcanizing oven is first heated after which its door is opened to introduce the rubber goods to be vulcanized. This, of course, reduces momentarily the temperature of the oven but the oven quickly regains its lost temperature, which is raised to the desired point as quickly as possible. In the case of vulcanization of boots and shoes I employ about 60 pounds pressure of steam in a steam jacket. After the door has been sealed in position, the oven is exhausted to a vacuum of about 27 inches. The vulcanizing medium in the form of carbon dioxid gas is then introduced into the oven through the compression pump, which is in operation, and through the preheater. When a pressure of carbon dioxid gas of about 30 pounds has been attained in the vulcanizing oven, the supply of carbon dioxid gas is cut off, and in a few minutes, owing to the high temperature of the steam (at about 85 pounds), in the preheater, the carbon dioxid gas attains a temperature at which vulcanization commences. In order to shorten the time of vulcanization the carbon dioxid gas is still further heated by the preheater, and also by the steam jacket until the proper vulcanization temperature has been reached, which, for boots and shoes, is about 280° F., and its pressure about 32 pounds. At this point the carbon dioxid is confined within the vulcanizing oven for the vulcanization period, which in the case of boots and shoes is about one and one half hours. When the carbon dioxid gas has reached a temperature of about 280° F. the steam pressure in the steam jacket of the vulcanizing oven may be reduced to about 46 pounds, at which point I have found that there is no loss of temperature of the carbon dioxid gas during the vulcanization period.

In the accompanying drawings I have shown a preferred form of apparatus for carrying out the hereinbefore described process. This apparatus may also be used in other processes for vulcanization. In the drawings Figure 1 is a top plan view of an apparatus embodying my invention. Fig. 2 is a side elevation. Fig. 3 is a view in vertical longitudinal section of a vulcanizing oven embodying my invention and applicable to the hereinbefore described process. Fig. 4 is a vertical section taken on the line 4—4 of Fig. 3, looking in the direction of the arrows. Fig. 5 is a vertical sectional view of a form of preheater.

Similar letters of reference designate corresponding parts in all of the figures.

A designates a vulcanizing oven of a suitable construction to withstand pressure both externally and internally, B is a storage tank for a vulcanizing medium such as carbon dioxid gas, C a compression pump preferably of the duplex compression type, and which may also act as a vacuum pump, D what I term a preheater, and E a vacuum pump.

The vulcanizing oven is preferably horizontally arranged, and it has an opening at one end which is closed by a swinging door or cover $a$. As shown, the door is suspended from a pivoted bracket $a'$ so that it may be swung into and out of position. (See Fig. 1). Bolts (not shown) or any other form of fastening may be used to hold the door tightly against the end of the vulcanizing oven. As here shown the vulcanizer is provided with a steam jacket comprising a casing $a^2$ and a steam coil $a^3$ in door $a$. A heat insulator $a^4$ (preferably asbestos) is shown as being provided between the wall of the door $a$ and the steam coil, and I also preferably inclose the steam jacket $a^3$ with a heat insulator. This, however, is not illustrated. Steam is supplied to the jacket and coil $a^3$ from a steam main $a^5$, a flexible and detachable connection $a^6$ being employed between the coil $a^3$ and the main $a^5$. Circulation of steam through the jacket and coil is provided for by the outlets $a^7$ which discharges into a pipe $a^8$ provided with a suitable form of steam trap $a^9$. The outlet $a^7$ from the steam coil is a preferably flexible and detachable connection. Other means may be employed to heat the vulcanizing oven, such, for example, as the arrangement of heating pipes within the oven hereinbefore set forth. It will be understood that suitable tracks are provided within the vulcanizing oven for trucks upon which are placed the rubber goods to be vulcanized.

The storage tank B for the carbon dioxid gas may be of any construction, and at least of a capacity hereinbefore set forth, and may be charged from any source through a valved pipe $b$. The carbon dioxid gas is discharged from the tank B, through pipes 1 and 2, to the compression side of the pump C, and discharged from the pump through pipes 3, 4, into what I term a preheater (Fig. 5), where it is heated and discharged through pipes 5, 6 and 7 into the vulcanizing oven at its forward end and at the bottom thereof (see Fig. 4). The heated gas, until it reaches the preferred vulcanizing temperature is passed through the vulcanizing oven back to the pump C through the pipes 8, 1 and 2, to be again returned to the vulcanizing oven through the preheater through the path just traced. When the carbon dioxid gas has reached its preferred vulcanizing temperature it is sealed in the vulcanizing oven by means of valves 9 and 10. After the vulcanization of the rubber goods, the carbon dioxid gas is returned to the storage tank B through the pipes 7, 6, 11, around the vacuum side of pump C by pass 12 and pipe 1 to the storage tank. Of course valves will be provided in the several pipe connections which will have to be opened and closed to permit of the flow of the carbon dioxid gas in the manner hereinbefore stated.

The form of preheater D which I have illustrated comprises a casing $d$ containing a plurality of coils $d'$ connecting at both ends with headers $d^2$. Steam is introduced and circulated through the casing $d$ in direct contact with the coils $d'$ in order to heat the carbon dioxid gas.

The vacuum pump E may be of any desired construction and it is connected with the interior of the vulcanizing oven through a valved connection 13.

Having thus described my invention, what I desire to claim is:—

1. A process of vulcanizing which consists in removing the atmosphere surrounding the goods and subsequently subjecting them to an atmosphere consisting of a gas substantially devoid of free oxygen, said gas having heat applied continuously thereto to maintain the requisite temperature therein evenly at all times.

2. A process for vulcanizing rubber goods which consists in introducing the rubber goods in a vulcanizing oven, heating the vulcanizing oven, causing a continuous circulation of a current of vulcanizing medium into and out of the oven until the same has reached the vulcanizing temperature and arresting the current of said medium in the vulcanizing oven.

3. A process for vulcanizing rubber goods which consists in introducing the rubber goods in a preheated vulcanizing oven, exhausting the vulcanizing oven of air, filling the vulcanizing oven with a vulcanizing medium which is substantially devoid of free oxygen, and which is preheated to the vulcanizing temperature.

4. A process for vulcanizing rubber goods which consists in introducing the rubber goods in a vulcanizing oven heated to a temperature about the vulcanizing temperature, filling the vulcanizing oven with a vulcanizing medium and circulating a continuous current of the same into and out of the vulcanizing oven until the vulcanizing temperature is reached, and confining and arresting the current vulcanizing medium within the vulcanizing oven until the required vulcanization is effected.

5. A process for vulcanizing rubber goods which consists in introducing the rubber goods into a vulcanizing oven heated to a temperature about the vulcanizing temperature, filling the vulcanizing oven with a vulcanizing medium and circulating a continuous current of the same into and out of the vulcanizing oven and a preheater until the vulcanizing temperature is reached, and then arresting the current of vulcanizing medium withing the vulcanizing oven until the required vulcanization is effected.

6. A process for vulcanizing rubber goods which consists in introducing the rubber goods into a vulcanizing oven, heating and maintaining the vulcanizing oven at a temperature about that required for the vulcanization, filling the vulcanizing oven with a vulcanizing medium, and circulating the medium into and out of the oven until it reaches its vulcanizing temperature, and then confining the heated vulcanizing medium within the oven until the required vulcanization is effected.

7. A process for vulcanizing rubber goods which consists in introducing the rubber goods into a vulcanizing oven, heating and maintaining the vulcanizing oven at a temperature about that required for vulcanization, exhausting the oven of air, filling the vulcanizing oven with a vulcanizing medium, and circulating the medium through the oven and a preheater until it reaches its vulcanizing temperature.

8. A process for vulcanizing rubber goods which consists in producing a desired vacuum in a heated vulcanizing oven containing the rubber goods to be vulcanized, and introducing into the oven a vulcanizing medium which is circulated through the vulcanizing oven and through a pressure pump which constantly raises the pressure without intermediate reduction.

9. A process for vulcanizing rubber goods which consists in producing a desired vacuum in a heated vulcanizing oven containing the rubber goods to be vulcanized, introducing into the oven a vulcanizing medium, and circulating it through the oven and a heater and giving said medium a gradually increasing pressure.

10. A process for vulcanizing rubber goods which consists in producing a desired vacuum in a heated vulcanizing oven containing the rubber goods to be vulcanized, introducing into the oven a vulcanizing medium, circulating it through the oven and a heater and giving said medium a gradually increasing pressure, and finally confining the same within the oven during a portion of the vulcanizing period.

11. In an apparatus for vulcanizing rubber goods, the combination with a vulcanizing oven, means for heating and maintaining the oven at a uniform temperature, means for supplying a vulcanizing gas to the oven at a definite pressure, a preheater, means for passing the said gas through the preheater to have it attain its vulcanizing temperature, and means for confining the gas within the vulcanizing oven after it has attained a vulcanizing temperature.

12. In combination, a heated vulcanizing oven, a source of vulcanizing gas, substantially devoid of free oxygen, means for cutting off the gas from the source after a determined pressure of gas has been attained in the oven, and means for preheating the gas as it passes into the vulcanizing oven.

13. In combination, a heated vulcanizing oven, a source of vulcanizing gas, substantially devoid of free oxygen, means for cutting off the gas from the source after a determined pressure of gas has been attained in the oven, and means for preheating the gas as it passes into the vulcanizing oven and for circulating the gas through the oven and heater until the gas has reached its vulcanizing temperature.

14. In combination, a heated vulcanizing oven, a source of vulcanizing gas, substantially devoid of free oxygen, means for cutting off the gas from the source after a determined pressure of gas has been attained in the oven, means for preheating the gas as it passes into the vulcanizing oven, and for circulating the gas through the oven and heater until the gas has reached its vulcanizing temperature, and means for confining the gas within the vulcanizing oven after it has reached a vulcanizing temperature.

15. In combination, a heated vulcanizing oven, a source of vulcanizing gas substantially devoid of free oxygen connected therewith, means for cutting off the gas from the source after a determined pressure of gas has been attained in the vulcanizing oven, a preheater, a compression pump, and means for affording a circulation of the gas by the pump through the preheater into the oven at one end and out of the oven at its opposite end 16. In combination, a heated vulcanizing oven, a source of vulcanizing gas substantially devoid of free oxygen connected therewith, means for cutting off the gas from the source after a determined pressure of gas has been attained in the vulcanizing oven, a preheater, a compression pump, means for affording a circulation of the gas by the pump through the preheater into the oven at one end and out of the oven at its opposite end, and means for confining the gas in the vulcanizing oven after it has attained a vulcanizing temperature.

17. In combination, a heated vulcanizing oven, a source of vulcanizing gas substantially devoid of free oxygen for supplying a volume of gas to said oven, a compression pump for gradually increasing the pressure of the volume of gas within the oven and having a connection for circulating the gas within the oven, and a heater for the gas while it is being circulated by the pump.

18. In combination, a heated vulcanizing oven, a source of vulcanizing gas substantially devoid of free oxygen for supplying a volume of gas to said oven, a compression pump for gradually increasing the pressure of the volume of gas within the oven and having a connection for circulating the gas within the oven, a heater for the gas while it is being circulated by the pump, and means for confining the gas within the oven when it reaches a desired temperature.

19. In a vulcanizing apparatus, a vulcanizing oven, means for heating the oven, means for creating a vacuum in said oven, a source of supply of vulcanizing medium substantially devoid of free oxygen, a heater, and means connected with said source, oven and heater for withdrawing medium from said source and circulating it through the heater and oven.

20. In a vulcanizing apparatus, a vulcanizing oven, means for heating the oven, means for creating a vacuum in said oven, a source of supply of vulcanizing medium substantially devoid of free oxygen, a heater for heating the medium, and means for drawing the medium from the source and also for circulating it through the oven and heater independently of the said source.

21. In a vulcanizing apparatus, a vulcanizing oven, means for heating the same, means for producing a vacuum in said oven, a source of supply of vulcanizing medium, a heater for the medium, a circulating system including said oven and heater, and means for drawing the medium from said source and also for circulating it through said system until a desired temperature and pressure of gas is reached in the oven, said means being of a type to gradually increase the pressure in the oven without intermediate reductions of pressure.

22. In a vulcanizing apparatus, a vulcanizing oven, means for heating the same, means for producing a vacuum in said oven, a source of supply of vulcanizing medium, a heater for the medium, a circulating system including said oven and heater, and a duplex pump for drawing the medium from said source and also for circulating it through the said system until a desired temperature and pressure of medium is produced in the oven.

23. That improvement in the art of treating rubber which consists in subjecting the article under treatment to a vacuum for purging the mass of material comprising the same of the volatile, gaseous and liquid components within and upon it, then discontinuing such vacuum, and then subjecting the said article to gas under pressure in excess of atmospheric and at a temperature below vulcanizing temperature for compacting the same, and then, while maintaining the said gas at the said pressure, raising the temperature of the said gas and vulcanizing the mass so purged and compacted.

24. That improvement in the art of treating rubber, which consists in subjecting the article under treatment to a reduced pressure and a temperature sufficient to volatilize and dissipate the volatile, gaseous and liquid matter within and upon the mass of said article, thereby facilitating the liberation and escape of the same from within the said mass, and then immediately thereafter subjecting the said article to the pressure of gas at a temperature below the vulcanizing temperature for compacting the said mass, and then, while maintaining the said pressure constant, vulcanizing the mass so freed from the said components and compacted.

25. The herein-described method which consists in placing articles to be vulcanized in a heated vulcanizing chamber, closing the chamber, producing a vacuum therein, breaking the vacuum, forcing heated gas below the vulcanizing temperature into the chamber, raising the pressure therein, and gradually heating the gas to vulcanizing temperature while maintaining the said pressure substantially constant.

26. The herein-described method of vulcanizing rubber articles, which consists in placing the articles upon forms, heating the vulcanizing chamber, placing the articles in the vulcanizing chamber, closing the chamber, materially reducing the pressure within the chamber, thereby drawing off the volatile constituents within the articles, and causing them to adhere to the forms, then raising the pressure within the chamber, and compacting the articles and then while maintaining the said pressure substantially constant heating the interior of the chamber and vulcanizing the articles.

In testimony whereof I hereunto sign my name in the presence of two subscribing witnesses.

ALLEN L. COMSTOCK.

Witnesses:
  KENNEDY M. THOMPSON,
  EUGENE W. RUTHERFORD.